(12) United States Patent
Kitani

(10) Patent No.: US 7,327,934 B2
(45) Date of Patent: Feb. 5, 2008

(54) DATA REPRODUCTION APPARATUS, DATA RECORDING APPARATUS, CIRCUIT ELEMENT, DATA REPRODUCTION METHOD AND DATA RECORDING METHOD

(75) Inventor: Satoshi Kitani, Tokyo (JP)

(73) Assignee: Sony Corporation, Tokyo (JP)

( * ) Notice: Subject to any disclaimer, the term of this patent is extended or adjusted under 35 U.S.C. 154(b) by 1003 days.

(21) Appl. No.: 10/413,026

(22) Filed: Apr. 14, 2003

(65) Prior Publication Data
US 2003/0231869 A1 Dec. 18, 2003

(30) Foreign Application Priority Data
Apr. 15, 2002 (JP) ............... 2002-112634

(51) Int. Cl.
*H04N 5/91* (2006.01)
*G11B 15/04* (2006.01)
*H04K 1/00* (2006.01)

(52) U.S. Cl. .............. 386/94; 360/60; 380/20
(58) Field of Classification Search .......... 386/1, 386/94, 125–126; 360/60; 380/201, 203
See application file for complete search history.

(56) References Cited

U.S. PATENT DOCUMENTS

| 5,886,979 | A * | 3/1999 | Moribe et al. | 369/47.12 |
| 6,571,220 | B1 * | 5/2003 | Ogino et al. | 705/51 |
| 6,615,192 | B1 * | 9/2003 | Tagawa et al. | 705/57 |
| 6,707,774 | B1 * | 3/2004 | Kuroda et al. | 369/53.21 |
| 6,865,677 | B1 * | 3/2005 | Echizen et al. | 713/176 |
| 2006/0280455 | A1 * | 12/2006 | Ando et al. | 386/95 |

FOREIGN PATENT DOCUMENTS

| EP | 0 969 463 | 1/2000 |
| JP | 11-353796 | 12/1999 |
| JP | 2001-229614 | 8/2001 |
| JP | 2001-359043 | 12/2001 |
| WO | WO 01/86650 | 11/2001 |

OTHER PUBLICATIONS

Bloom, J A et al: "Copy Protection for DVD Video", Proceedings of the IEEE, IEEE. New York, US, vol. 87, No. 7, Jul. 1999, pp. 1267-1276, XP000861525.

* cited by examiner

*Primary Examiner*—Thai Q. Tran
*Assistant Examiner*—Daquan Zhao
(74) *Attorney, Agent, or Firm*—Oblon, Spivak, McClelland, Maier & Neustadt, P.C.

(57) ABSTRACT

A circuit element is disclosed which restricts reproduction of an illegally duplicated recording medium and prevents illegal duplication of a recording medium. The circuit element is incorporated in a data reproduction apparatus or a data recording apparatus and includes an encryption discrimination section for discriminating whether or not data recorded on a recording medium is encrypted data, a digital watermark status detection section for detecting digital watermark status from within the data read from the recording medium, a determination section for determining, if it is discriminated that the data recorded on the recording medium is encrypted data, that the read data should not be filtered, but determining, if it is discriminated that the data recorded on the recording medium is not encrypted data, whether or not the read data should be filtered based on the digital watermark status, and a filter processing section for filtering part of the read data based on a result of the determination by the determination section.

12 Claims, 14 Drawing Sheets

F I G. 4

| Sector No. | Zone | Description |
|---|---|---|
| SectorNo. 192511 / SectorNo. 192512 (02EFFFh / 02F000h) | Initial Zone | In all Physical Sectors the Main Data is set to (00) |
| SectorNo. 192544 (02F020h) | Reference Code Zone | 32 Physical Sectors |
| SectorNo. 193024 (02F200h) | Buffer Zone 1 | 480 Physical Sectors with the Main Data set to (00) |
| SectorNo. 196096 (02FE00h) | Control Data Zone | 3072 Physical Sectors |
| SectorNo. 196608 (030000h) | Buffer Zone 2 | 512 Physical Sectors with the Main Data set to (00) |
| | Data Zone | |

FIG. 10
| DIGITAL WATERMARK STATUS DETECTED BY WM DETECTOR (WM_STATUS) | DATA FILTER CONTROL |
|---|---|
| Copy Free | RECORDING & REPRODUCTION PERMITTED→FILTER OFF |
| Copy Once | RECORDING & REPRODUCTION INHIBITED→FILTER ON |
| Copy No More | RECORDING & REPRODUCTION INHIBITED→FILTER ON |
| Copy Never | RECORDING & REPRODUCTION INHIBITED→FILTER ON |
FIG. 11
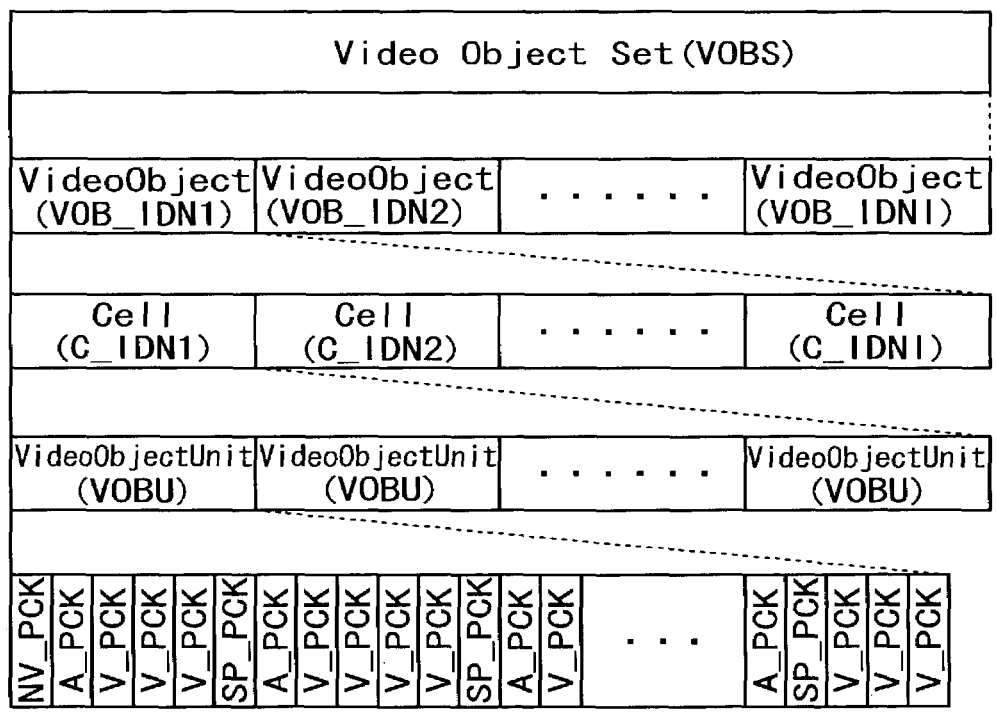
FIG. 12
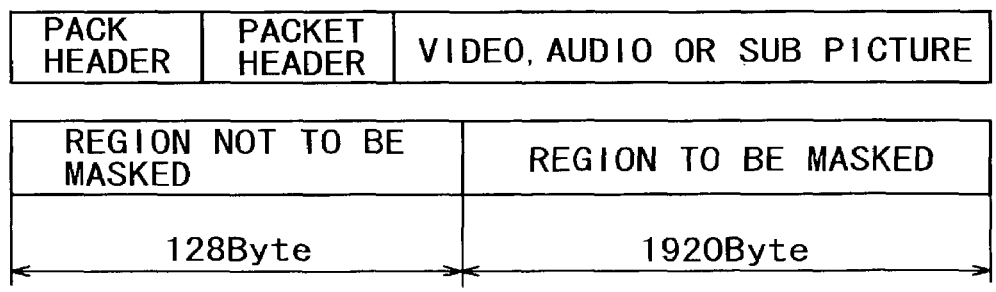

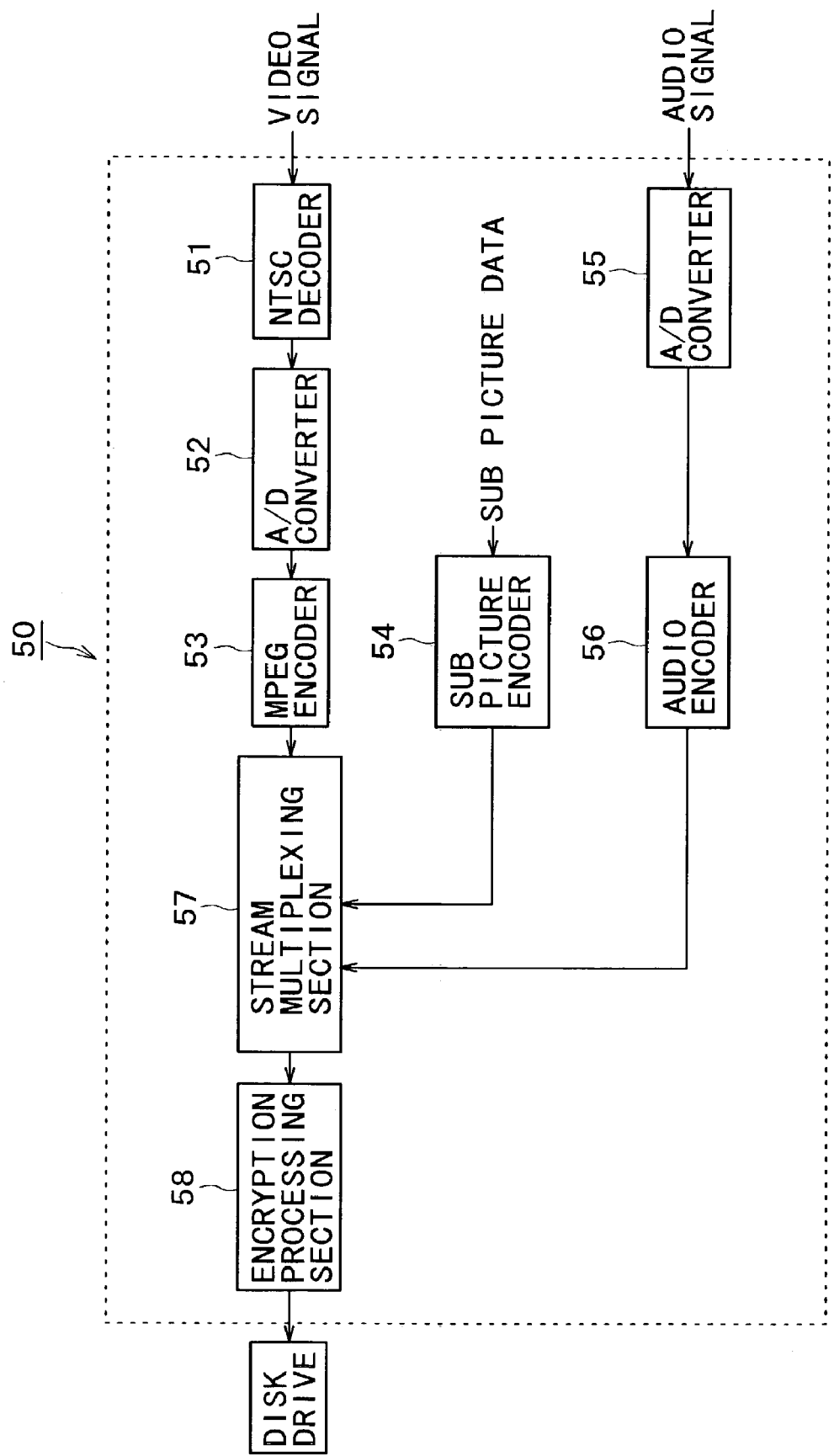

DATA REPRODUCTION APPARATUS, DATA RECORDING APPARATUS, CIRCUIT ELEMENT, DATA REPRODUCTION METHOD AND DATA RECORDING METHOD

BACKGROUND OF THE INVENTION

This invention generally relates to prevention of illegal duplication of digital data, and more particularly to a data reproduction apparatus, a data recording apparatus, a circuit element, a data reproduction method and a data recording method wherein digital watermark status is utilized to prevent illegal duplication of digital data.

On a recording medium such as a DVD (Digital Versatile Disc), a large amount of data, for example, for one movie, can be recorded as digital information. As it becomes possible to record image information and so forth as digital information in this manner, it progressively becomes significant to prevent illegal duplication to achieve protection of the copyright holder.

For example, for the DVD-Video, a copyright protection technique called CSS (Content Scramble System) is available. Where the CSS is applied, although a DVD-Video file can be copied onto a hard disk, since MPEG (Moving Picture Experts Group) data of the copied file is in an encrypted state, the data cannot be decoded by an MPEG decoder. Consequently, copy of the digital data can be prevented. In order to cancel the CSS, a predetermined encryption key is required.

Further, the CSS approves application thereof only to DVD-ROM (Digital Versatile Disc-Read Only Memory) media, and a CSS contract prohibits application to recordable DVD media such as the DVD-R, DVD-RW, DVD+R and DVD+RW. Accordingly, bit-by-bit copy from a DVD-Video disk to such recordable DVD media as mentioned above is not an action approved by the CSS contract.

This quite similarly applies to the CPPM (Content Protection for Pre-Recorded Media) which is a copyright protection technique for the DVD-Audio.

However, since such a situation that DeCSS software for decrypting the encryption of the CSS is distributed on the Internet has occurred, there is a problem that an action of decrypting the encryption of the DVD-Video into plain text and recording the plain text onto a recordable DVD can be executed simply.

In order to take a countermeasure against the action just described, a technique of utilizing a digital watermark technique to prevent illegal duplication has been proposed. The digital watermark technique embeds predetermined digital watermark status into image information and/or sound information in advance and detects, upon recording or reproduction, the digital watermark status to prevent illegal duplication.

Various disk drives have been proposed which detect digital watermark status to prevent illegal duplication. Such disk drives, however, have the following problems.

In particular, for example, it has been proposed in Japanese Patent Laid-Open No. 2000-115727 to detect digital watermark status by means of a DVD drive apparatus and control, if it is discriminated from the detected digital watermark status that the DVD has been duplicated illegally, to return an error status, which instructs not to permit any of readout and writing, to a personal computer (PC) which controls the DVD driver apparatus.

However, since a definition of an error status based on such detection of digital watermark status as described above is not applied between the personal computer and the DVD drive apparatus, the error status received from the drive apparatus is an error not expected by the personal computer. Consequently, it is estimated with a considerably high degree of possibility that the personal computer may suffer from malfunction of application software or an abnormal end and, in the worst case, the personal computer may be placed into a hang-up state.

Also a technique has been proposed that a DVD player or a DVD recorder detects digital watermark status recorded on a DVD, discriminates based on the detected digital watermark status whether or not the DVD is an illegal duplicate, and restricts its output if the DVD is an illegal duplicate. However, such a DVD player or a DVD recorder as described above is configured such that the output restriction is performed at a stage later than an MPEG decoder under the control of a CPU (Central Processing Unit). Therefore, there is a problem that production of an illegally duplicated DVD or reproduction of an illegally duplicated DVD can be executed simply by circuit reconstruction such as change of wiring lines or alteration to firmware.

SUMMARY OF THE INVENTION

It is an object of the present invention to provide a data reproduction apparatus, a data recording apparatus, a circuit element, a data reproduction method and a data recording method wherein protection against illegal duplication which uses digital watermark status is tough against a protection canceling action by reconstruction of a circuit or alteration to firmware and reproduction of an illegally duplicated recording medium and illegal duplication of a recording medium are prevented.

In order to attain the object described above, according to an aspect of the present invention, there is provided a data reproduction apparatus, including installation means for receiving thereon a recording medium on which data including digital watermark status is recorded, discrimination means for discriminating a type of the recording medium received by the installation means, reading means for reading the data including the digital watermark status from the recording medium received by the installation means, digital watermark status detection means for detecting the digital watermark status from within the data read from the recording medium by the reading means, determination means for determining, if it is discriminated by the discrimination means that the recording medium is of a first type, that the data read by the reading means should not be filtered, but determining, if it is discriminated by the discrimination means that the recording medium is of a second type, whether or not the data read by the reading means should be filtered based on the digital watermark status detected by the digital watermark status detection means, filter processing means for filtering, if it is determined by the determination means that the data should be filtered, part of the data read by the reading means, and outputting means for outputting the data filtered by the filter processing means and the data read by the reading means but not filtered by the filter processing means.

With the data reproduction apparatus, since it itself deals with an illegally duplicated recording medium in such a manner that, when it is tried to reproduce an illegally duplicated recording medium on the data reproduction apparatus, the data read out from the recording medium is masked based on digital watermark status detected from the recording medium and resulting data is outputted, there is no necessity to send back an error status or a like signal to a host personal computer. Accordingly, the necessity for a countermeasure against an illegally duplicated recording medium by the personal computer side is eliminated, and therefore, an illegally duplicated recording medium can be eliminated without having an influence on operation of the personal-computer.

According to another aspect of the present invention, there is provided a data recording apparatus which includes recording means for recording data onto a recording medium, including inputting means for inputting the data including digital watermark status, digital watermark status detection means for detecting the digital watermark status from within the data inputted by the inputting means, determination means for determining whether or not the data inputted by the inputting means should be filtered based on the digital watermark status detected by the digital watermark status detection means, and filter processing means for filtering, if it is determined by the determination means that the data should be filtered, part of the data inputted by the inputting means and outputting resulting data, the recording means recording the data filtered by the filter processing means and the data inputted by the inputting means but not filtered by the filter processing means onto the recording medium.

With the data recording apparatus, since it itself deals with illegal recording onto a recording medium in such a manner that, when it is tried to illegally record data onto a recording medium using the data recording apparatus, the data is masked based on digital watermark status detected from within the data and resulting data is outputted, there is no necessity to send back an error status or a like signal to a host personal computer. Accordingly, the necessity for a countermeasure against illegal recording by the personal computer side is eliminated, and therefore, an illegal duplicating action can be eliminated without having an influence on operation of the personal computer.

According to a further aspect of the present invention, there is provided a circuit element incorporated in a data reproduction apparatus, which includes reading means for reading data recorded on a recording medium and including digital watermark data, for processing the data read by the reading means and including the digital watermark status, including inputting means for inputting the data read by the reading means and including the digital watermark status, encryption discrimination means for discriminating whether or not the data inputted by the inputting means is encrypted data, digital watermark status detection means for detecting the digital watermark status from within the data inputted by the inputting means, determination means for determining, if it is discriminated by the encryption discrimination means that the data recorded on the recording medium is encrypted data, that the data inputted by the inputting means should not be filtered, but determining, if it is discriminated by the encryption discrimination means that the data recorded on the recording medium is not encrypted data, whether or not the data inputted by the inputting means should be filtered based on the digital watermark status detected by the digital watermark status detection means, filter processing means for filtering, if it is determined by the determination means that the data should be filtered, part of the data inputted by the inputting means, and outputting means for outputting the data filtered by the filter processing means and the data inputted by the inputting means but not filtered by the filtering means, the inputting means, encryption discrimination means, digital watermark status detection means, determination means, filter processing means and outputting means being integrated in the circuit element.

With the circuit element, detection of digital watermark status and elimination of illegally duplicated data based on the detected digital watermark status are executed in the closed circuit element itself. Consequently, an illegal data reproduction action by reconstruction of hardware, alteration to firmware or the like can be prevented.

According to a still further aspect of the present invention, there is provided a circuit element incorporated in a data recording apparatus, which includes recording means for recording data onto a recording medium, and including data processing means integrated therein for processing the data to be recorded onto the recording medium, including inputting means for inputting the data including digital watermark status, digital watermark status detection means for detecting the digital watermark status from within the data inputted by the inputting means, determination means for determining whether or not the data inputted by the inputting means should be filtered based on the digital watermark status detected by the digital watermark status detection means, filter processing means for filtering, if it is determined by the determination means that the data should be filtered, part of the data inputted by the inputting means and outputting resulting data, and outputting means for outputting the data filtered by the filter processing means and the data inputted by the inputting means but not filtered by the filter processing means to the recording means, the inputting means, digital watermark status detection means, filter processing means and outputting means being integrated in the circuit element.

With the circuit element, detection of digital watermark status and elimination of data to be illegally recorded based on the detected digital watermark status are executed in the closed circuit element itself. Consequently, an illegal data recording action onto a recording medium by reconstruction of hardware, alteration to firmware or the like can be prevented.

According to a yet further aspect of the present invention, there is provided a data reproduction method, including the steps of receiving a recording medium on which data including digital watermark status is recorded, discriminating a type of the received recording medium according to information recorded on the recording medium thereof, reading the data including the digital watermark status from the received recording medium, detecting the digital watermark status from within the data read from the recording medium, determining, if it is discriminated that the received recording medium is of a first type, that the read data should not be filtered, and outputting the read data based on the determination that the read data should not be filtered, but determining, if it is discriminated that the received recording medium is of a second type, whether or not the read data should be filtered based on the detected digital watermark status, and outputting the read data based on the determination based on the digital watermark status that the read data should not be filtered, but filtering part of the read data based on the discrimination based on the digital watermark status that the read data should be filtered and outputting the filtered data.

With the data reproduction method, since a data reproduction apparatus itself to which the data reproduction method is applied deals with an illegally duplicated recording medium in such a manner that, when it is tried to reproduce an illegally duplicated recording medium on the data reproduction apparatus, the data read out from the recording medium is masked based on digital watermark status detected from the recording medium and resulting data is outputted, there is no necessity to send back an error status or a like signal to a host personal computer. Accordingly, the necessity for a countermeasure against an illegally duplicated recording medium by the personal computer side is eliminated, and therefore, an illegally duplicated recording medium can be eliminated without having an influence on operation of the personal computer.

According to a yet further aspect of the present invention, there is provided a data recording method for a data recording apparatus which includes recording means for recording data onto a recording medium, including the steps of inputting the data including digital watermark status, detecting the digital watermark status from within the inputted data, determining whether or not the inputted data should be filtered based on the detected digital watermark status, and the recording means recording, if it is determined that the data should not be filtered, the inputted data onto the recording medium, but filtering, if it is determined that the data should be filtered, part of the inputted data and outputting resulting data, the recording means recording the filtered and outputted data onto the recording medium.

With the data recording method, since the data recording apparatus itself deals with illegal recording onto a recording medium in such a manner that, when it is tried to illegally record data onto a recording medium using the data recording apparatus, the data is masked based on digital watermark status detected from within the data and resulting data is outputted, there is no necessity to send back an error status or a like signal to a host personal computer. Accordingly, the necessity for a countermeasure against illegal recording by the personal computer side is eliminated, and therefore, an illegal duplicating action can be eliminated without having an influence on operation of the personal computer.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a diagrammatic view showing a lead-in region of a DVD used in the disk drive;

FIG. 10 is a diagrammatic view illustrating control criteria used by the readout data filter and a write data filter of the disk drive;

FIG. 11 is a diagrammatic view showing a DVD video format used in the disk drive;

FIG. 12 is a diagrammatic view showing a structure of a pack and a region to be masked in the DVD video format shown in FIG. 11;

FIG. 18 is a block diagram showing a configuration of a disk recorder to which the disk drive is applied.

DETAILED DESCRIPTION OF THE PREFERRED EMBODIMENTS

Figure 1:
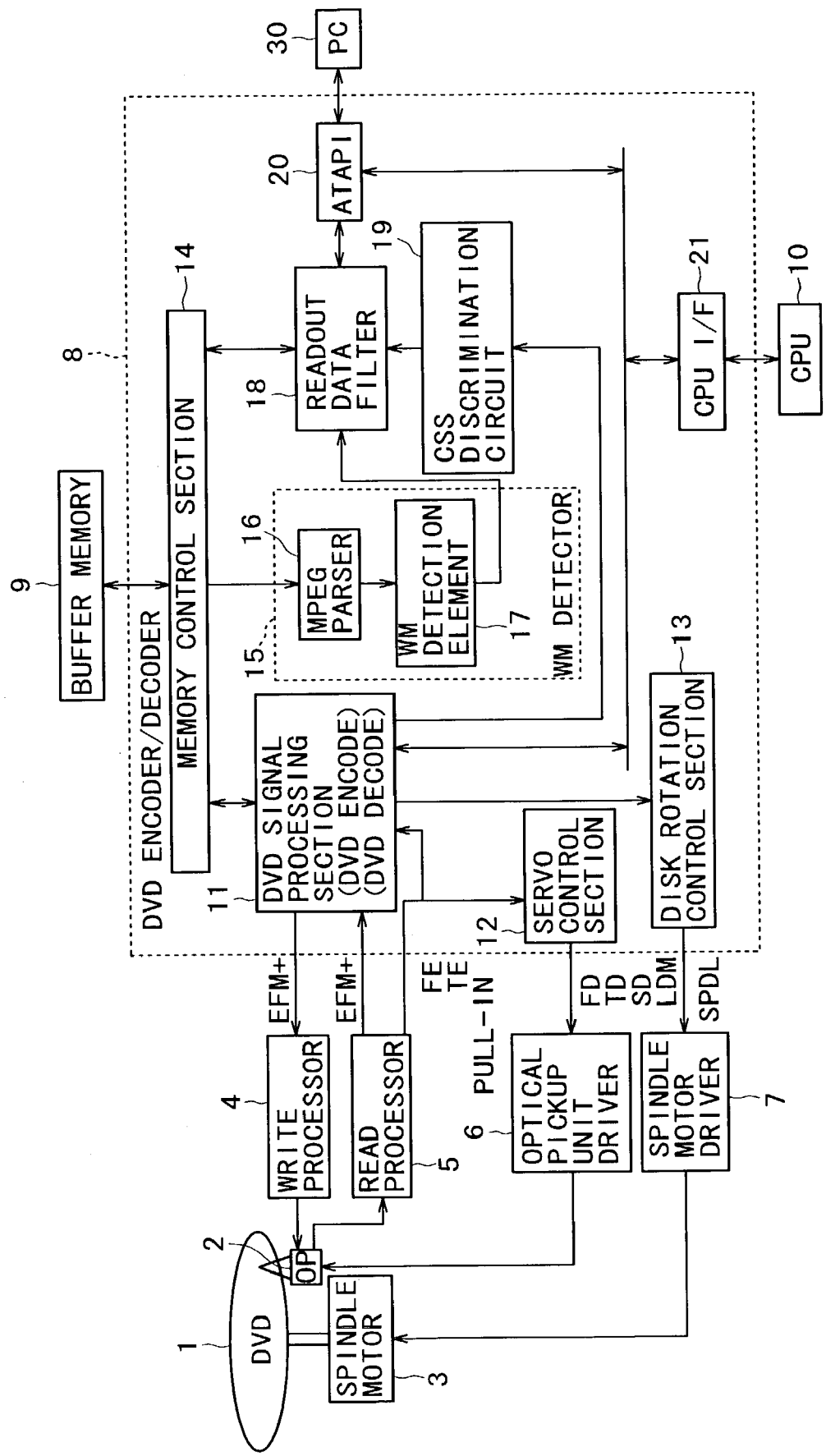
FIGS. 1 and 2 are block diagrams showing a configuration of a disk drive to which the present invention is applied.
Figure 2:
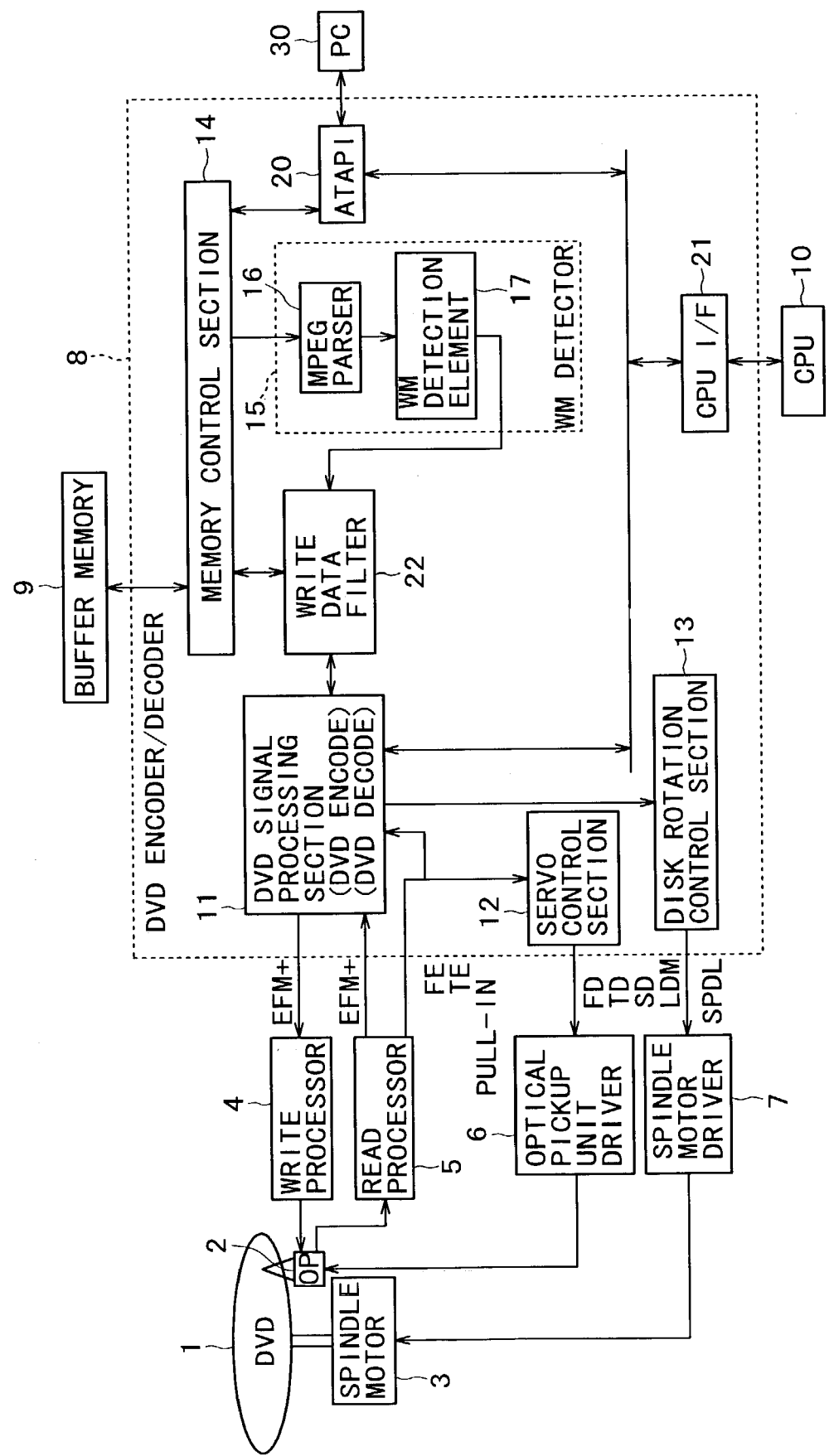

The present invention is applied to a disk drive which is shown in block diagrams of FIGS. 1 and 2. It is to be noted that FIGS. 1 and 2 show a DVD encoder/decoder 8 in somewhat different configurations for the convenience of description. FIG. 1 is used for description of reproduction operation of the disk drive while FIG. 2 is used for description of recording operation of the disk drive. However, the disk drive actually includes both of functioning blocks shown in FIG. 1 and functioning blocks shown in FIG. 2. Further, while the embodiment of the present invention uses a DVD, the present invention can be applied to reproduction and recording techniques not only of a DVD but also of any other recording medium which uses digital watermark status or encrypted data.

The disk drive is an apparatus which receives a DVD 1 mounted at a predetermined position thereof and reproduces the thus loaded DVD 1. The disk drive is connected to a personal computer (PC) 30 such that operations thereof such as a reproduction operation of the loaded DVD 1 are controlled by the personal computer 30 connected thereto.

The DVD 1 may be a DVD Video Disc (DVD-ROM) protected (encrypted) by the content scramble system (CSS), a DVD Video Disc (DVR-ROM, DVD-R, DVD-RW, DVD+R or DVD+RW) which is not protected by the CSS system, an illegally copied DVD, a DVD produced by the user itself, or a copy DVD legally approved for private utilization.

Further, a recordable medium such as the DVD-R, DVD-RW, DVD+R or DVD+RW may be ready for the CPRM (Content Protection for Recordable Media) which allows recording of a picture with regard to which "copy once" (Copy Once contents) onto a DVD or the like is permitted such as a digital broadcast or software on the market.

The DVD 1 has a digital watermark status recorded thereon such that it does not deteriorate the picture quality of images or pictures. The digital watermark status includes four kinds of information representative of different states of the DVD 1 including "Copy Free" representing permission of copy, "Copy Once" representing permission of duplication only once, "Copy No More" representing inhibition of further duplication, and "Copy Never" representative of inhibition of duplication. It is to be noted that ROM media have the digital watermark status of "Copy Free" or "Copy Never" recorded thereon.

The disk drive includes an optical pickup unit 2, a spindle motor 3, a write processor 4, a read processor 5, an optical pickup unit driver 6, a spindle motor driver 7, a DVD encoder/decoder 8, a buffer memory 9 and a CPU 10.

Though not shown, the optical pickup unit 2 includes a laser diode for emitting a laser beam of a predetermined wavelength, an objective lens for condensing the laser beam of the predetermined wavelength emitted from the laser diode and emitting the condensed laser-beam upon a data recording surface of the DVD 1 and for condensing reflected light reflected from the data recording surface of the DVD 1 and emitting the condensed reflected light, a two-axis actuator for carrying and actuating the objective lens in response to a predetermined control signal to effect focusing adjustment and tracking adjustment, and a photo-detector for receiving the reflected light reflected from the data recording surface of the DVD 1 and converting the received reflected light into an electric signal to detect presence or absence of a pit on the data recording surface. The electric signal detected by the photo-detector is generally called RF (Radio Frequency) signal.

Further, the optical pickup unit 2 includes a thread motor for driving the optical pickup unit 2 to move in a radial direction of the DVD 1.

Furthermore, where the disk drive includes a function of loading the DVD 1 placed on a disk tray not shown, the optical pickup unit 2 includes a loading motor for moving the disk tray.

The spindle motor 3 drives the DVD 1 mounted in position to rotate.

The write processor 4 controls the laser power of the laser diode of the optical pickup unit 2 in order to acquire an EFM+ (Eight to Fourteen Modulation Plus) signal to carry out writing onto the DVD 1.

The read processor 5 produces a DVD reading EFM+ signal, an FE (Focus Error) signal for focusing servo, a TE (Tracking Error) signal for tracking servo, and a Pull-in signal from the RF signal detected by the photo-detector provided in the optical pickup unit 2, and transmits the produced signals to a servo control section 12 of the DVD encoder/decoder 8 hereinafter described.

The optical pickup unit driver 6 is a driver IC (Integrated Circuit) for driving the two-axis actuator, thread motor and loading motor not shown of the optical pickup unit 2 described above in accordance with a predetermined control signal.

The spindle motor driver 7 is a driver IC for driving the spindle motor 3 described hereinabove in accordance with a predetermined control signal.

The DVD encoder/decoder 8 is a DVD core LSI (Large Scale Integration) having various functions included in a semiconductor package and executes signal processing of the disk drive and control based on a result of the processing. It is to be noted that the configuration and the functions of the DVD encoder/decoder 8 are hereinafter described in detail.

The buffer memory 9 is a randomly accessible memory such as a DRAM (Dynamic Random Access Memory) and temporarily stores data signaled from a DVD signal processing section 11, data signaled from the personal computer 30 and data signaled from the CPU 10.

The CPU 10 is connected to the DVD encoder/decoder 8 through an interface (CPU I/F) 21 and generally controls the functions of the disk drive.

Subsequently, the configuration and the functions of the DVD encoder/decoder 8 are described. The DVD encoder/decoder 8 includes a DVD signal processing section 11, a servo control section 12, a disk rotation control section 13, a memory control section 14, a watermark (WM) detector 15, a readout data filter 18, a CSS discrimination circuit 19, an ATAPI (AT Attachment with Packet Interface) 20, a CPU interface 21, and a write data filter 22.

It is to be noted that, although the write data filter 22 is not shown in FIG. 1 and the readout data filter 18 and the CSS discrimination circuit 19 are not shown in FIG. 2 for the convenience of description, the DVD encoder/decoder 8 actually includes all of the functioning section or sections not shown in FIG. 1 or 2.

The DVD signal processing section 11 includes an RS-PC encoder-decoder, an ID processing and 8/16 conversion circuit for address detection, and a Wobble detector for discriminating whether or not the recording medium loaded is a recordable medium.

The servo control section 12 produces control signals for controlling driving of the two-axis actuator and the thread motor of the optical pickup unit 2 in response to the FE signal, TE signal and Pull-in signal transmitted thereto from the read processor 5, and transmits the produced control signals to the optical pickup unit driver 6.

The disk rotation control section 13 produces a control signal for controlling rotation of the spindle motor 3 on which the DVD 1 is mounted and signals the produced control signal to the spindle motor driver 7.

The memory control section 14 controls writing and readout of data into and from the buffer memory 9.

The watermark detector 15 is a digital watermark status detector including an MPEG parser 16 and a watermark (WM) detection element 17 for detecting digital watermark status.

The MPEG parser 16 performs detection of the MPEG start code and extraction of an MPEG Video bit Stream.

The watermark detection element 17 is a digital watermark status detection signal processing section. Upon completion of detection of digital watermark status, the watermark detection element 17 issues a notification of WM CCI (WaterMark Copy Control Information) of a result of the detection to the readout data filter 18 and the write data filter 22.

The readout data filter 18 masks to invalidate part of image and sound signals of sector data of a unit of 2 KB which is pack data prescribed in the DVD Video standards or the DVD Video Recording standards and read out from the buffer memory 9 through the memory control section 14 based on a result of the discrimination of the watermark detector 15 or the CSS discrimination circuit 19 and outputs a resulting signal of the masking to the ATAPI 20.

The CSS discrimination circuit 19 detects a region in which flag information representing that a CSS KEY for decrypting the CSS is recorded from a physical address PSN (Physical Sector Number) of data decoded by the DVD signal processing section 11 and discriminates whether or not the DVD 1 is a medium encrypted by the CSS. The CSS discrimination circuit 19 may refer to Disk Category information or wobble information hereinafter described to discriminate whether or not the DVD 1 is a ROM medium or a recordable medium.

The ATAPI 20 is an interface for interconnecting the personal computer 30 and the disk drive to allow communication of data between them.

It is to be noted that the interface for connection to the personal computer 30 may be not only the ATAPI 20 but also, for example, the SCSI (Small Computer System Interface), USB (Universal Serial Bus), IEEE (Institute of Electrical and Electronics Engineers) 1394 or the like.

The CPU interface 21 is an interface for connecting the DVD encoder/decoder 8 and the CPU 10 to each other so that the DVD encoder/decoder 8 may be controlled by the CPU 10.

The write data filter 22 masks to invalidate part of image and sound signals of sector data of a unit of 2 KB which is pack data prescribed in the DVD Video standards or the DVD Video Recording standards read out from the buffer memory 9 through the memory control section 14 based on a result of the discrimination of the watermark detector 15 and outputs a resulting signal of the masking to the DVD signal processing section 11.

The personal computer 30 is connected to the disk drive through the ATAPI 20 of the DVD encoder/decoder 8 or the like and controls operations of the disk drive such as, for example, reproduction, recording, stopping, removal (eject) of the DVD 1 and data search when a predetermined command is inputted thereto. The user can utilize various kinds of data of the DVD 1 through the personal computer 30.

Now, a reproduction operation of the disk drive is described with reference to FIG. 3.

First at step S1, the user will mount a DVD 1 into a predetermined location of the disk drive.

At step S2, the personal computer 30 reads in, in response to the mounting of the DVD 1, the lead-in region of the DVD 1 and discriminates whether or not the data recorded on the DVD 1 is protected against copy, that is, whether or not the recorded data is under the CSS (is in an encrypted state).

This discrimination is performed by detecting flag information recorded in a CPR_MAI region belonging to sector data of each of sectors in a Content Provider Information region in a Control Data Zone in the lead-in region. Where the flag information mentioned above is recorded in the CPR_MAI region, this indicates that a CSS KEY which is key information for decrypting the CSS is recorded on the DVD 1.

Figure 5:
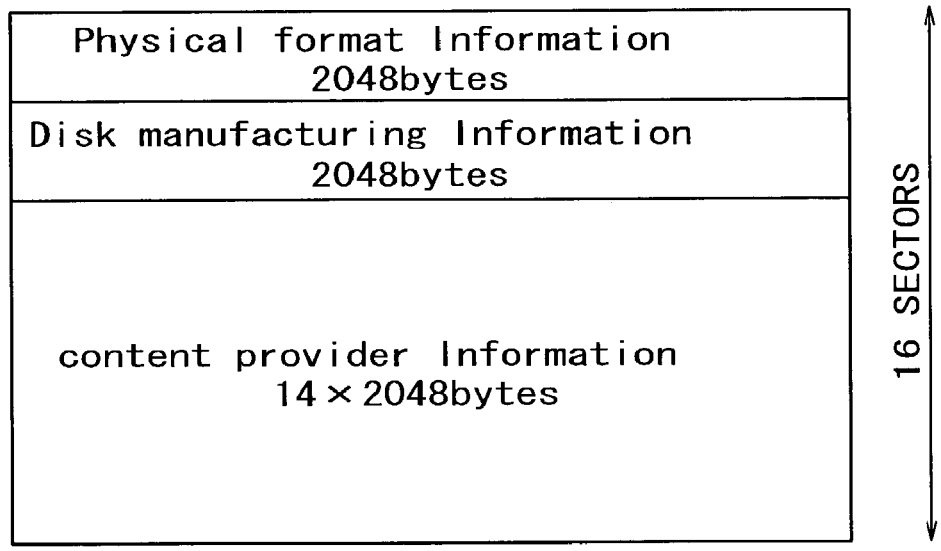
FIG. 5 is a diagrammatic view showing a configuration of an ECC block of a Control Data Zone of the lead-in region shown in FIG. 4.

Referring to FIG. 4, the Control Data Zone of the lead-in region is a region from the sector number 02F200h to the sector number 02FE00h. A plurality of data of a unit of 16 sectors illustrated in FIG. 5 are recorded in the Control Data Zone.

Figure 6:
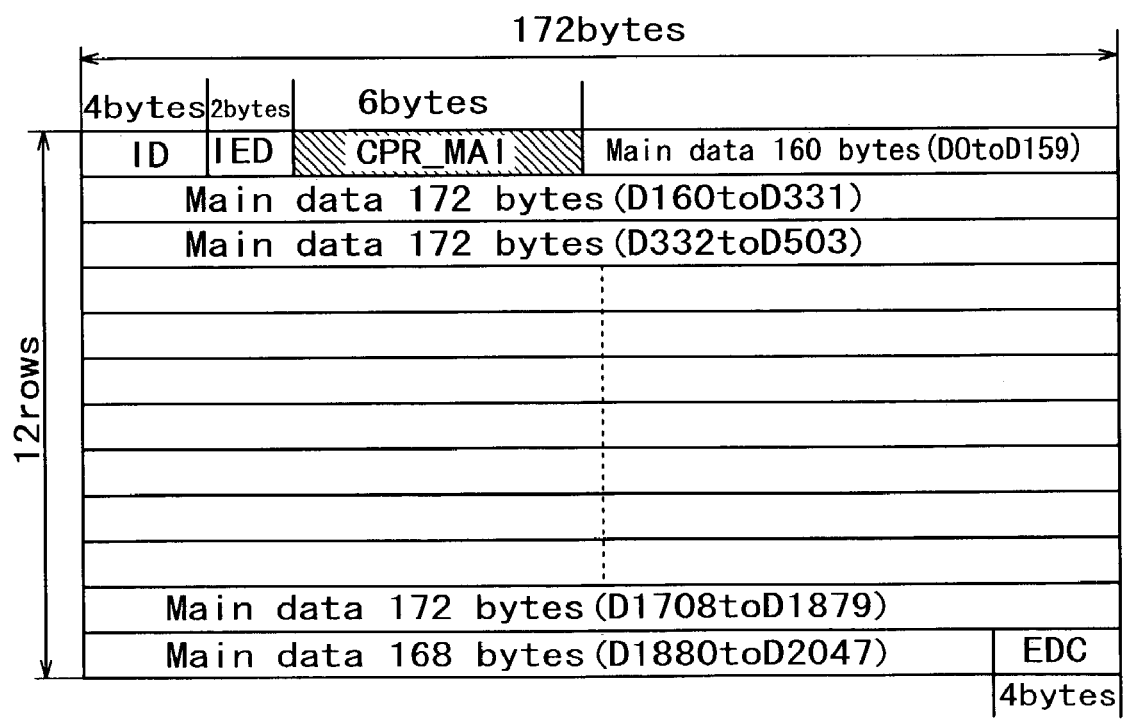
FIG. 6 is a diagrammatic view showing a configuration of sector data in the ECC block shown in FIG. 5.

The data of a unit of 16 sectors includes a Physical format information region in which Disk Category information for specifying the type of the DVD 1 is recorded, a Disk manufacturing information region, and a Content Provider Information region. The Content Provider information region is formed from 14 sectors each having such a data structure as illustrated in FIG. 6. Where the DVD 1 is protected by the CSS, flag information representing that the DVD 1 holds the CSS KEY is recorded in the CPR_MAI which belongs to each of the sectors of the Content Provider Information.

Data of the lead-in region decoded in a unit of 32 KB (1 ECC block=16 sectors) by the DVD signal processing section 11 through the optical pickup unit 2 and the read processor 5 is transferred to the CSS discrimination circuit 19.

Figure 7:
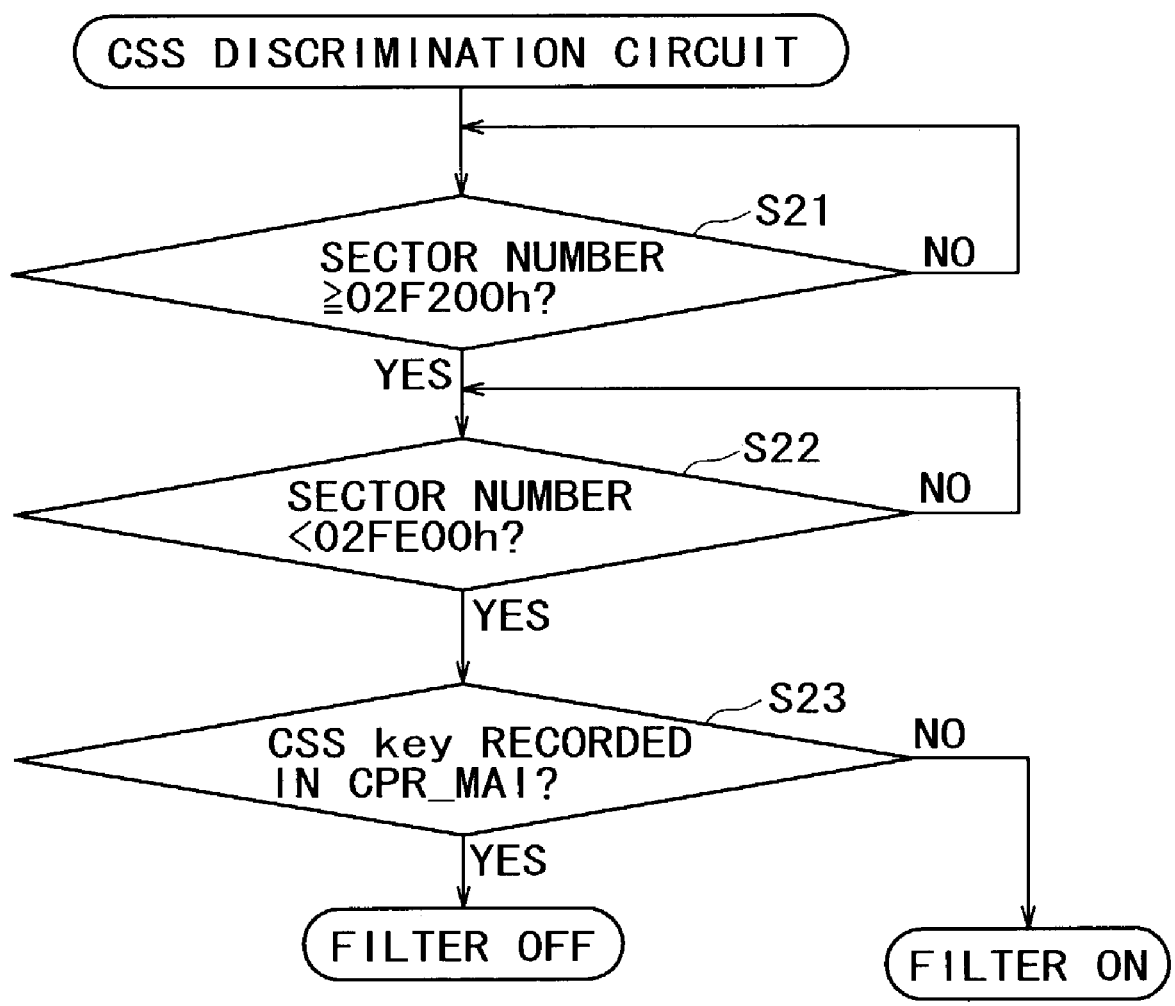
FIGS. 7 and 8 are flow charts illustrating different operations of a CSS discrimination circuit of the disk drive.

The CSS discrimination circuit 19 detects, from the data transferred thereto, the flag information representing that the CSS key is recorded, for example in such a manner as illustrated in a flow chart of FIG. 7.

Referring to FIG. 7, the CSS discrimination circuit 19 discriminates whether or not the sector number is equal to or greater than the start sector number 02F200h of the Control Data Zone (step S21) and discriminates whether or not the sector number is the end sector number 02FE00h (step S22) to discriminate whether or not the data is data within the Control Data Zone.

If the data is not data within the Control Data Zone, the CSS discrimination circuit 19 reserves discrimination of whether the readout data filter 18 should be turned ON or OFF.

If the CSS discrimination circuit 19 discriminates at steps S21 and S22 that the data transferred thereto from the DVD signal processing section 11 is data within the Control Data Zone, then the processing advances to step S23, at which the CSS discrimination circuit 19 discriminates whether or not the flag information representing that the CSS KEY is recorded on the DVD 1 is included in the CPR_MAI region.

If the flag information representing that the CSS KEY is recorded is detected, then the CSS discrimination circuit 19 discriminates that the data recorded on the DVD 1 is protected against copy (encrypted) by the CSS and notifies the readout data filter 18 that the readout data filter 18 should be turned OFF. On the other hand, if the flag information representing that the CSS KEY is recorded is not detected, then the CSS discrimination circuit 19 discriminates that the data recorded on the DVD 1 is not protected against copy (encrypted) by the CSS and notifies the readout data filter 18 that the readout data filter 18 should be turned ON.

Figure 8:
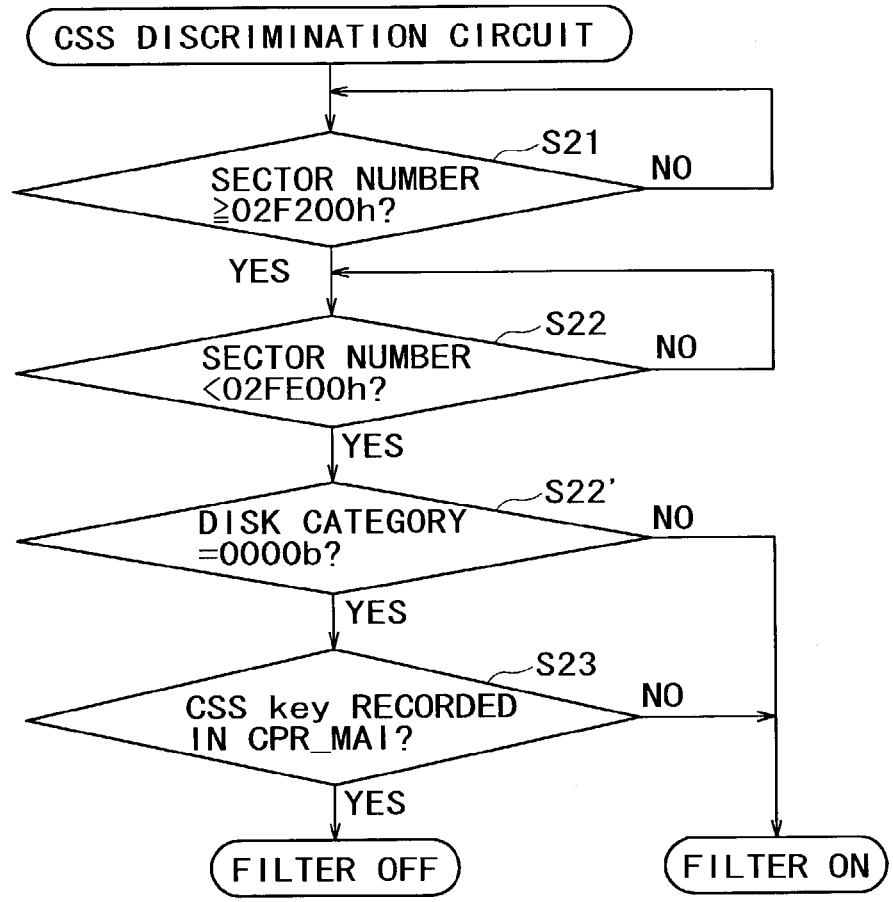

The processing operation of the CSS discrimination circuit 19 described above with reference to the flowchart of FIG. 7 may be modified in such a manner as seen in a flow chart of FIG. 8.

The flow chart of FIG. 8 includes an additional step S22' inserted between the steps S22 and 23 of the flow chart of FIG. 7.

At step S22', the CSS discrimination circuit 19 discriminates whether the DVD 1 loaded in the disk drive is a ROM disk or a recordable disk.

If the DVD 1 is a recordable disk, then the CSS discrimination circuit 19 discriminates that the CSS is not applied to the DVD 1 and the flag information representing that the CSS KEY is recorded is not recorded in the CPR_MAI region, and notifies the readout data filter 18 that the readout data filter 18 should be turned ON. However, if the CSS discrimination circuit 19 discriminates that the DVD 1 is a ROM disk, then it determines that there is the possibility that the CSS may be applied to the DVD 1 and advances the processing to step S23.

It is to be noted that the CSS discrimination circuit 19 in the disk drive of the embodiment of the present invention performs the discrimination of whether the DVD 1 is a ROM disk or a recordable disk by discrimination of whether or not the Disk Category data recorded in the Physical format information region is "0000b". If the Disk Category data is "000b", then the CSS discrimination circuit 19 discriminates that the DVD 1 loaded in the disk drive is a ROM disk. It is otherwise possible, however, to discriminate whether the DVD 1 is a ROM disk or any other disk than a ROM disk from the wobble frequency.

According to the flow chart illustrated in FIG. 8, if a recordable disk such as the DVD-R, DVD-RW, DVD+R or DVD+RW is loaded in the disk drive and the loaded recordable disk is ready for the CPRM, then since the data recorded on the recordable disk may not always be in an encrypted state, when it is discriminated that the DVD 1 is a recordable disk, the readout data filter 18 is turned ON.

Figure 3:
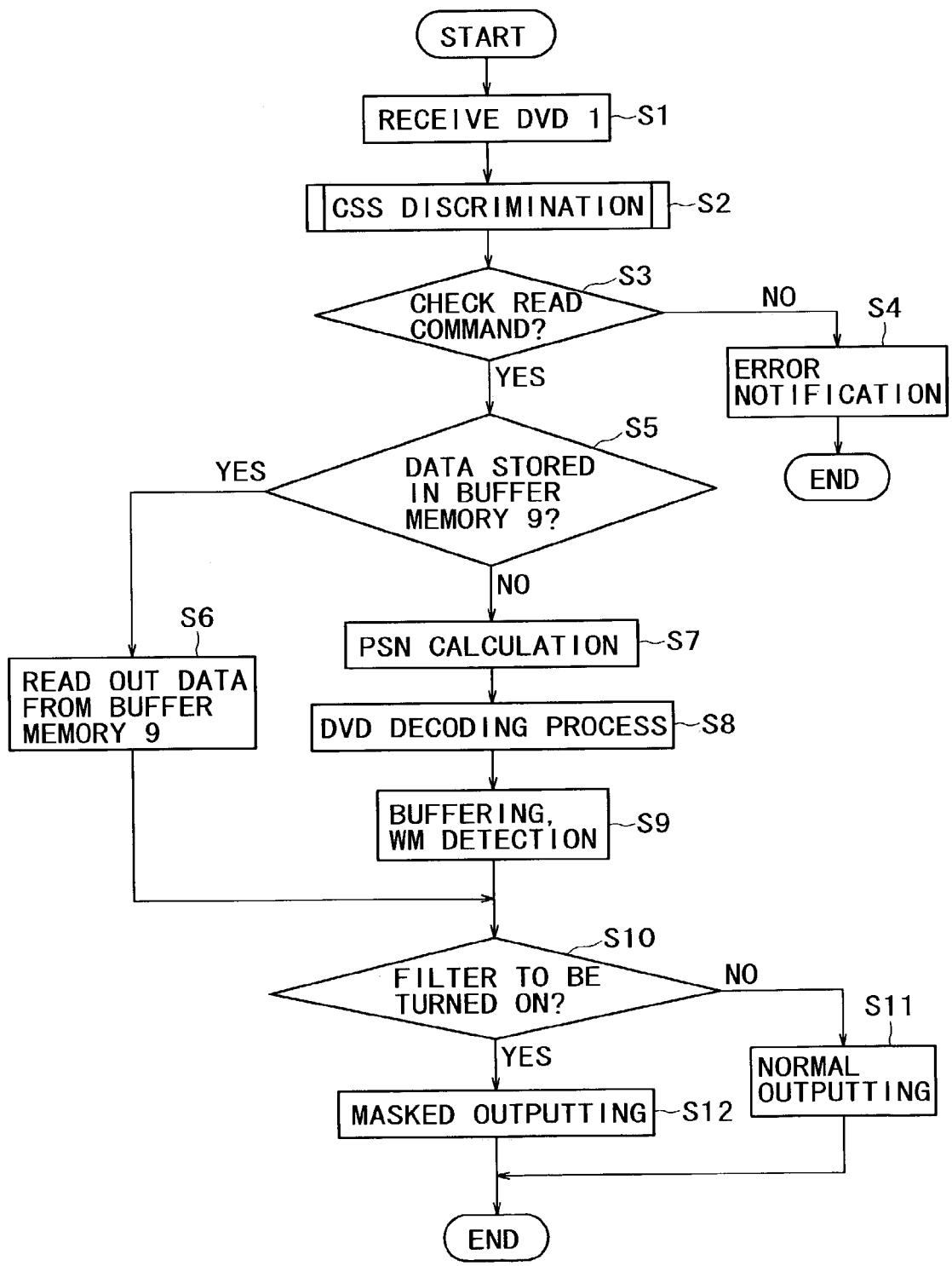
FIG. 3 is a flow chart illustrating operation of the disk drive when it reproduces data.

Referring back to the flow chart of FIG. 3, the personal computer 30 outputs a read command for reading out predetermined data recorded on the DVD 1 to the disk drive at step S3. The read command is outputted from the personal computer 30 to the CPU 10 through the ATAPI 20 and the CPU interface 21 together with LBA (Logical Block Address) information representing a recorded location of the predetermined data recorded on the DVD 1 and data length information of the data to be read out.

The CPU 10 performs a command check of the read command inputted thereto to discriminate whether or not the read command is executable. If the inputted command is not executable, then the processing advances to step S4, but if the inputted command is executable, then the processing advances to step S5.

At step S4, the CPU 10 notifies the personal computer 30 that the read command inputted from the personal computer 30 is not executable. In response to the notification, the personal computer 30 outputs an error message through the application software.

At step S5, the CPU 10 discriminates whether or not data of the designated data length is stored in the buffer memory 9. If data of the designated data length is stored, then the processing advances to step S6, but if data of the designated data length is not stored, then the processing advances to step S7.

At step S6, the CPU 10 reads out the data stored in the buffer memory 9 2 KB by 2 KB of a unit of sector data and advances the processing to step 10 so that the data read out is transferred to the personal computer 30 through the readout data filter 18 and the ATAPI 20.

At step S7, the CPU 10 calculates a PSN (Physical Sector Number) from the LBA transmitted thereto from the personal computer 30. Consequently, positioning control for moving the optical pickup unit 2 to a readout start position of the DVD 1 can be performed.

After the positioning control is completed, data is read out from the designated PSN of the DVD 1.

At step S8, the CPU 10 controls the DVD signal processing section 11 to perform a DVD decoding process for the read out data. The unit of processing by the DVD signal processing section 11 is 32 KB (1 ECC block=16 sectors).

At step S9, the data obtained by the DVD decoding process in a unit of 16 sectors by the DVD signal processing section 11 is stored into the buffer memory 9 through the memory control section 14.

Simultaneously, data same as the data obtained by the DVD decoding process in a unit of 16 sectors and stored into the buffer memory 9 is outputted through the memory control section 14 to the watermark detector 15, by which digital watermark status is detected. The digital watermark status thus detected is outputted to the readout data filter 18.

At step S10, the readout data filter 18 discriminates based on a result of the discrimination by the CSS discrimination circuit 19 and the digital watermark status detected at step S9 whether the readout data filter 18 should be turned ON or OFF.

Figure 9:
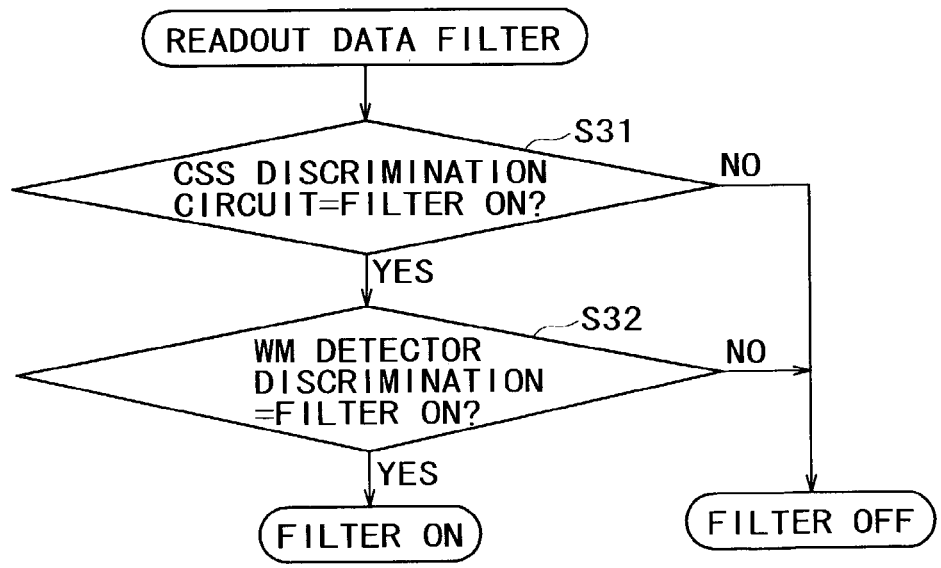
FIG. 9 is a flow chart illustrating operation of a readout data filter of the disk drive.

If, for example, as seen from a flow chart of FIG. 9, a discrimination made by the CSS discrimination circuit 19 (step S31) or a discrimination made based on the digital watermark status (step S32) indicates that the readout data filter 18 should be turned OFF, then a final decision to turn the readout data filter 18 OFF is made.

On the other hand, if another discrimination that the readout data filter 18 should be turned ON (step S32) is made through the discrimination by the CSS discrimination circuit 19 (step S31) and the discrimination based on the digital watermark status (step S32), then a final decision to turn the readout data filter 18 ON is made.

The ON/OFF decision of the readout data filter 18 is executed, for example, based on a table illustrated in FIG. 10.

Referring to FIG. 10, if the digital watermark status of "Copy Free" is detected, then it is discriminated that reproduction is permitted, and the readout data filter 18 is turned OFF. If the digital watermark status of "Copy Once" is detected, then it is discriminated that reproduction is inhibited, and the readout data filter 18 is turned ON. If the digital watermark status of "Copy No More" is detected, then it is discriminated that reproduction is inhibited, and the readout data filter 18 is turned ON. If the digital watermark status of "Copy Never" is detected, then it is discriminated that reproduction is inhibited, and the readout data filter 18 is turned ON.

In this instance, while, if the readout data filter 18 is turned ON even once, two techniques can be applied including a technique that the power supply to the disk drive is cut or the readout data filter 18 is kept ON so as to be valid until the DVD 1 is ejected from the disk driver and another technique that a result of the detection of digital watermark status by the watermark detector 15 is reflected at it is, any one of the two techniques may be applied.

It is to be noted that, according to the CSS, not all of the data recorded on the DVD 1 is encrypted, and a region in which data is encrypted and a region in which data is not encrypted appear alternately and intermittently. The reason why data is encrypted intermittently in this manner is that, when the CSS was prescribed initially, the processing capacity of a personal computer was not very high and encryption of all data would have imposed a very high load on a DVD-Video reproduction operation.

If the readout data filter 18 should be turned OFF at step S9, then the processing advances to step S11, but if the readout data filter 18 should be turned ON, then the processing advances to step S12.

At step S11, the personal computer 30 reads out data by data of a predetermined unit for the designated readout data length from within the data stored in the buffer memory 9.

The data is read out in a unit of 2 KB from the buffer memory 9, and since the readout data filter 18 is OFF, the data read out passes through the readout data filter 18 and is outputted to the personal computer 30 through the ATAPI 20.

At step S12, the personal computer 30 reads out data by data of the predetermined unit for the designated readout data length from within the data stored in the buffer memory 9.

The data is read out in a unit of 2 KB from the buffer memory 9, and since the readout data filter 18 is ON, part of the data of a unit of 2 KB is replaced with predetermined dummy data by the readout data filter 18 to mask the data, and resulting data is outputted to the personal computer 30 through the ATAPI 20.

A data structure of the DVD video format is described with reference to FTG. 11.

Data defined by the DVD video format is called Video Object Set (VOBS) and is composed of a plurality of Video Objects (VOB_IDNi). Each of the Video Objects (VOB_IDNi) is divided into units called Cell ($C_{13}$ INDi). Each of the Cells (C_INDi) is composed of Video Object Units (VOBU) which are units which can be searched by the disk drive. Furthermore, each of the Video Object Units (VOBU) is composed of a plurality of packs (PACK) which are a minimum unit of the DVD video format.

A pack is sector data of 2 KB, and four different packs are available including a Navi Pack (NV_PCK) in which information upon search is recorded, a Video Pack (V_PCK) which is a minimum unit of video data, an Audio Pack (A_PCK) which is a minimum unit of audio data, and a Sub-Picture Pack (SP_PCK) which is a minimum unit of a sub picture.

An object of the masking by the readout data filter 18 described above is contents information such as the Video Pack (V_PCK), Audio Pack (A_PCK) and Sub-Picture Pack (SP_PCK) other than the Navi Pack (NV_PCK) which is control information.

As seen in FIG. 12, the header region for the pack header and the packet header is set as a region not to be masked (128 bytes) while part of the contents information is set as a region to be masked (1,920 bytes). By securing a rather great region of 128 bytes as the region not to be masked as seen in FIG. 12, even where an encryption system other than the CSS is used for copy protection and the header length for the pack header and the packet header changes accordingly, copy protection can be coped with sufficiently.

By excepting control information such as the pack header and the packet header from the object of masking in this manner, only that contents information whose illegal reproduction is to be prevented can be masked without disturbing control of the video reproduction application in the personal computer 30.

Figure 13:
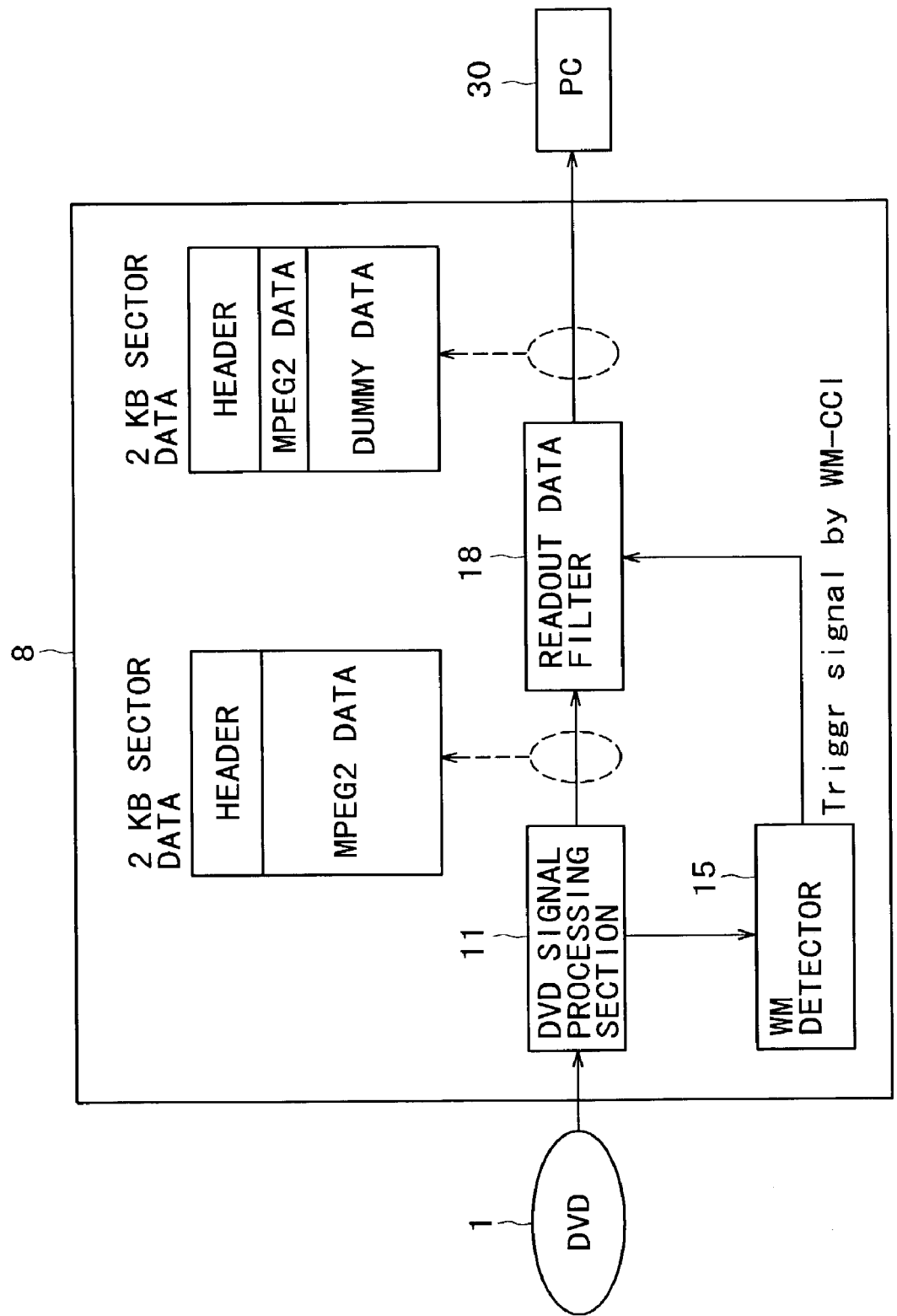
FIG. 13 is a block diagram illustrating a concept of a process by a DVD encoder/decoder in the disk drive.

Thus, even if the DVD 1 is recorded illegally, reproduction thereof can be prevented by detecting decoded data by means of the DVD signal processing section 11 in the DVD encoder/decoder 8 of the disk drive and replacing (masking), for each unit of a sector of 2 KB, only a contents portion of the data with dummy data by means of the readout data filter 18 based on digital watermark status as seen from FIG. 13.

Incidentally, initialization of the readout data filter 18 and initialization of the CSS discrimination circuit 19 upon reading out are both ON and are states in which the filter operation is valid.

Consequently, if an operation of reading out information regarding encryption of contents recorded on the DVD 1 in advance such as flag information representing that the CSS KEY is recorded on the DVD 1 is not performed once upon reading out, the filter exhibits an ON state irrespective of a result of the watermark detector 15, and the contents cannot be reproduced correctly. Consequently, it can be made an obligation to perform the discrimination of whether or not the CSS is applied to the disk without fail.

It is necessary to execute this initialization operation not only when the power supply to the disk drive is made available and upon a resetting operation of the entire disk drive such as hardware resetting but also when the disk is ejected in a reading out operation which involves an operation of the CSS discrimination circuit 19. Therefore, a mechanism for detecting ejection of the DVD 1 is required.

In the following, two different particular methods for detecting that the DVD 1 is ejected from the disk drive are described.

Figure 14:
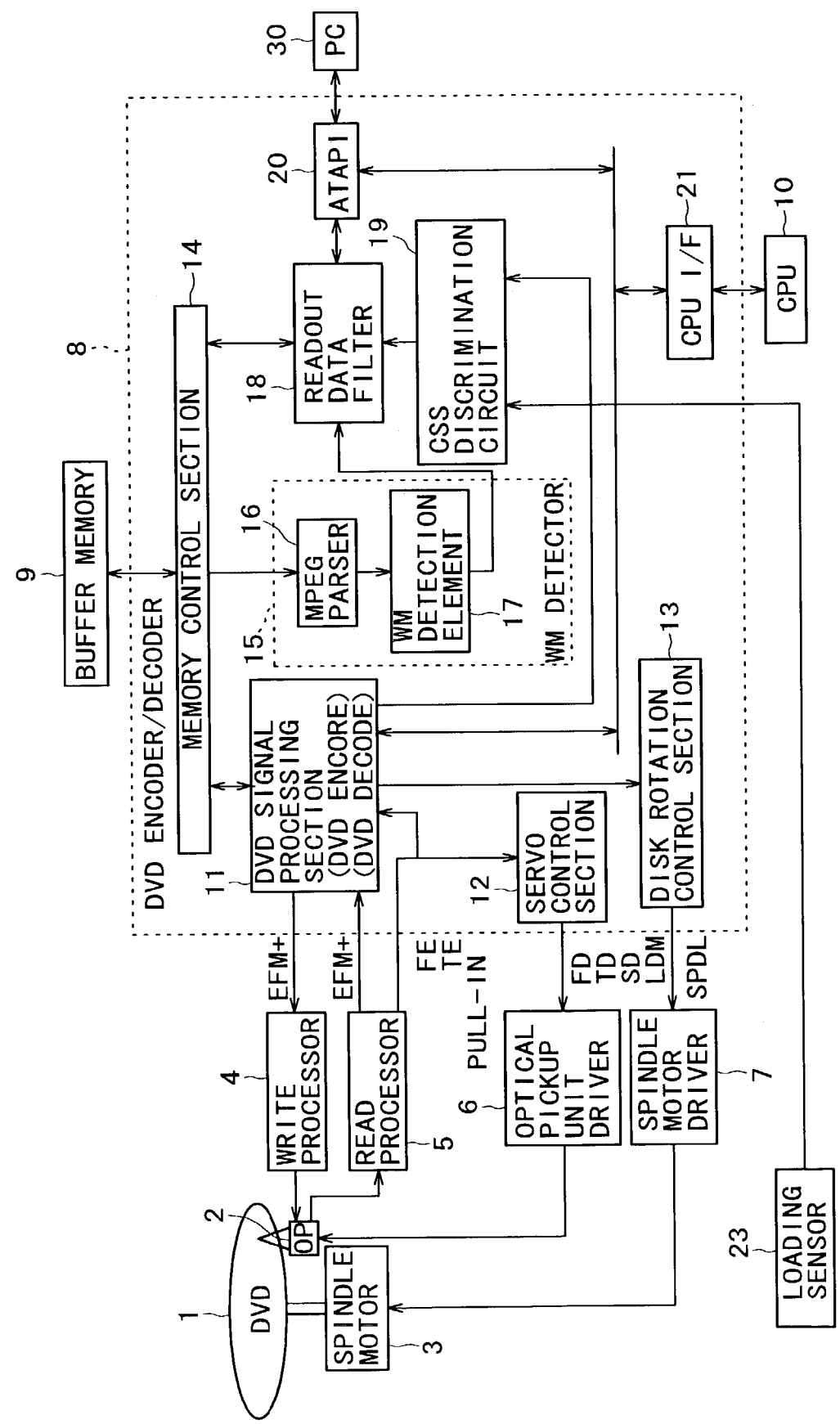
FIG. 14 is a block diagram showing a modification to the disk drive of FIG. 1 which additionally includes a loading sensor.

FIG. 14 shows the disk drive apparatus shown in FIG. 1 which additionally includes a loading sensor 23. The loading sensor 23 is connected to the CSS discrimination circuit 19.

The loading sensor 23 discriminates, for example, where or not the disk tray on which the DVD 1 is carried arrives at the predetermined position in the disk drive. By detecting whether or not the DVD 1 is in a state mechanically drawn in the disk drive by means of the loading sensor 23, if the disk tray is moved even a little amount from the predetermined position, it can be discriminated that the DVD 1 is ejected. If it is discriminated that the DVD 1 is ejected, then this is conveyed to the CSS discrimination circuit 19, and consequently, the CSS discrimination circuit 19 is initialized.

Figure 15:
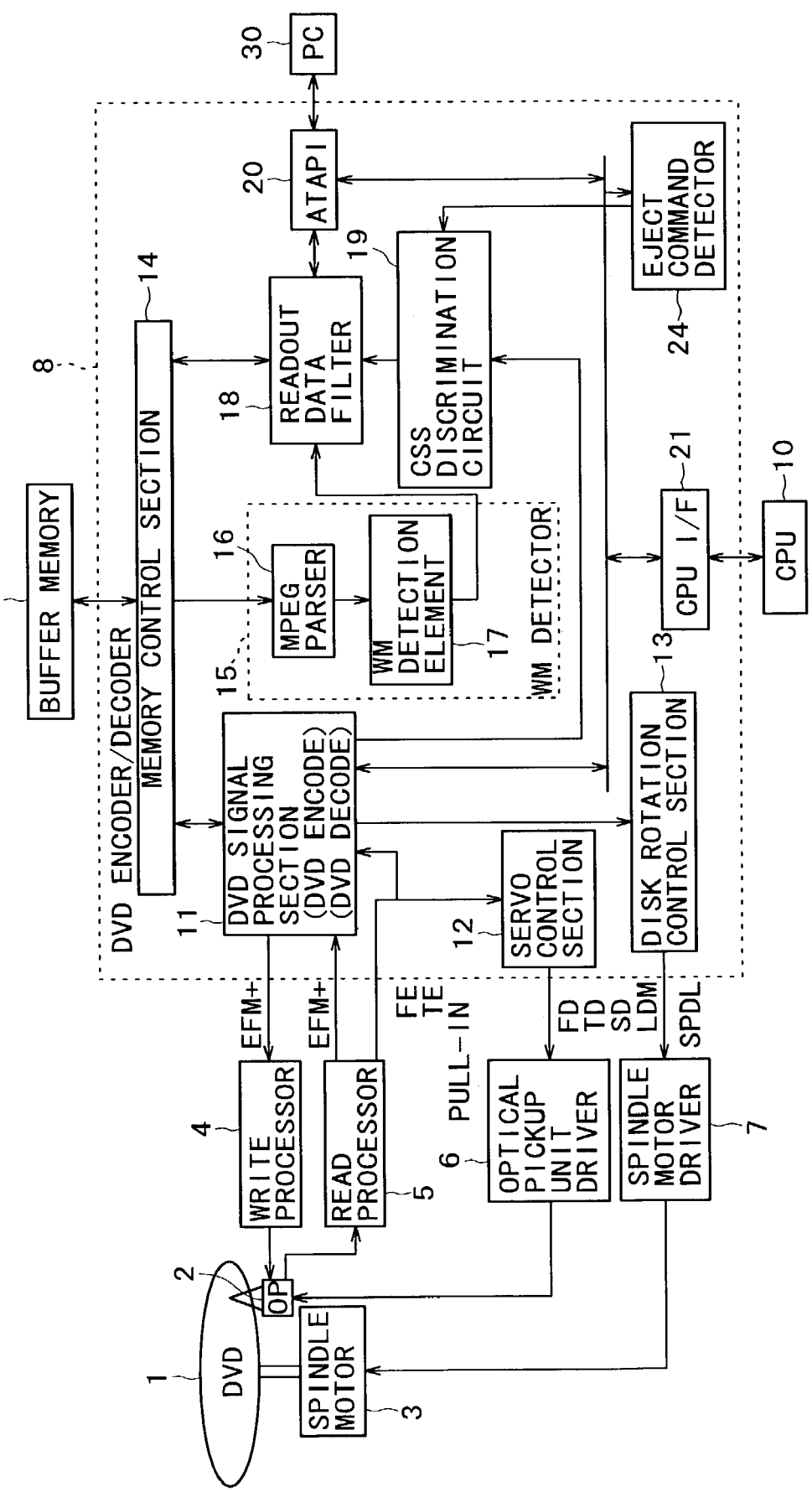
FIG. 15 is a block diagram showing another modification to the disk drive of FIG. 1 which additionally includes an eject command detector.

FIG. 15 shows the disk drive shown in FIG. 1 which additionally includes an eject command detector 24. The eject command detector 24 is connected to the CSS discrimination circuit 19 and the ATAPI 20.

The eject command detector 24 checks a command code of an ATAPI code issued from the personal computer 30 and issues, if it is discriminated that the command code represents the eject command, a notification of this to the CSS discrimination circuit 19 to initialize the CSS discrimination circuit 19.

By detecting whether or not the DVD 1 is ejected from the disk drive in this manner, even when a DVD 1 not ready for the CSS is reproduced after another DVD 1 ready for the CSS is reproduced once, the readout data filter 18 is not placed into an OFF state. Consequently, unless a region in which the flag information representing that the CSS KEY is recorded is read out again, reproduction is not permitted.

Accordingly, the readout restriction function of data based on digital watermark status can be compulsorily rendered operative.

Figure 16:
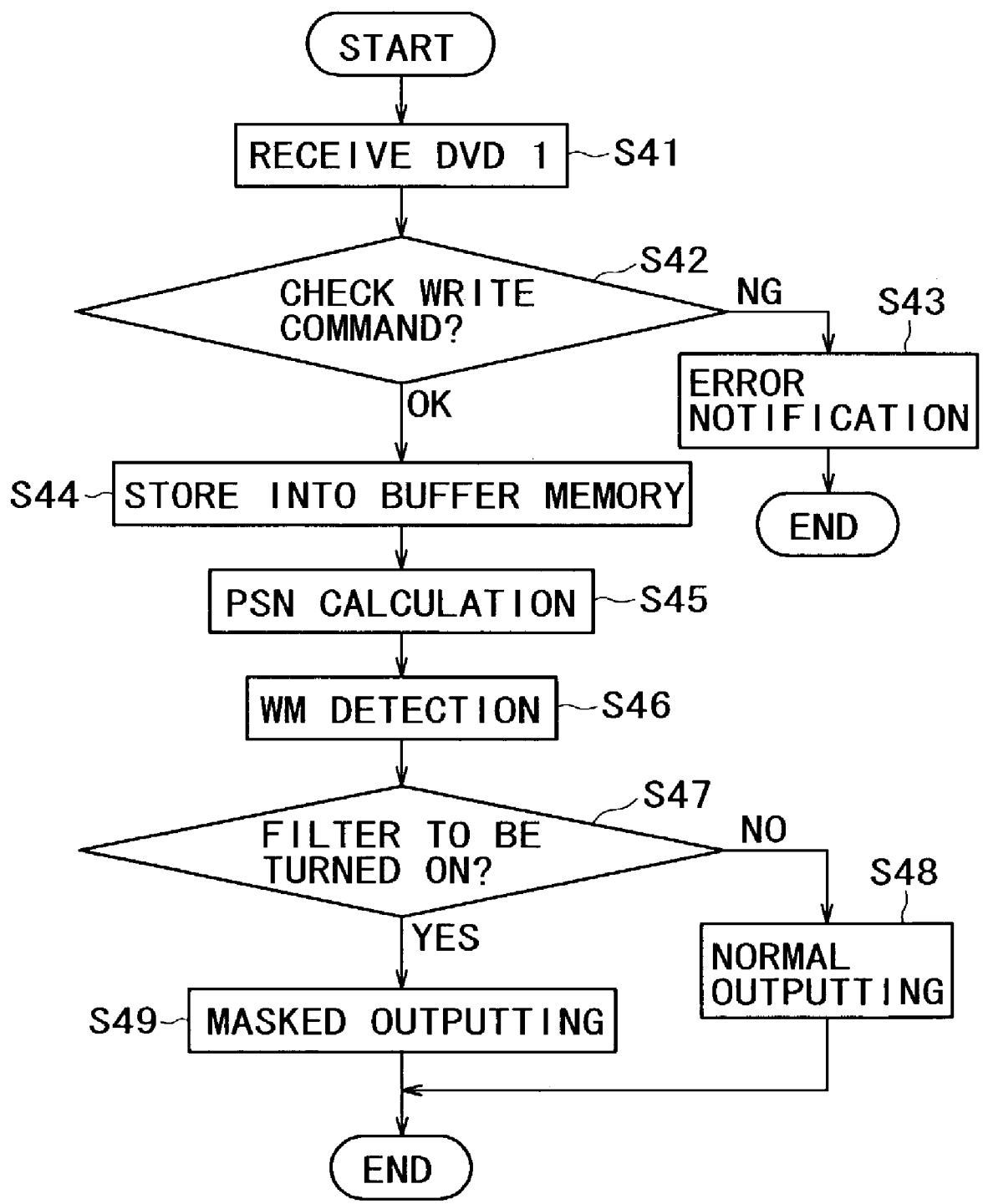
FIG. 16 is a block diagram illustrating operation of the disk drive of FIG. 2 when it records data.

Subsequently, a recording operation of the disk drive is described with reference to a flow chart of FIG. 16.

At step S41, the user will mount a DVD 1 into the predetermined location of the disk drive.

At step S42, the personal computer 30 outputs a write command for recording predetermined data onto the DVD 1 to the disk drive.

The write command is outputted from the personal computer 30 to the CPU 10 through the ATAPI 20 and the CPU interface 21 together with LBA (Logical Block Address) information representative of a data writing location of the DVD 1 and data length information of data to be written.

The CPU 10 checks the write command outputted thereto to discriminate whether or not the write command is executable. If the write command is not executable, then the processing advances to step S43, but if the write command is executable, then the processing advances to step S44.

At step S43, the CPU 10 notifies the personal computer 30 that the write command inputted from the personal computer 30 is not executable. In response to the notification, the personal computer 30 outputs an error message through the application software or the like.

If the CPU 10 discriminates at step S42 that the write command inputted from the personal computer 30 is executable, then the data is transferred to the buffer memory 9 in a unit of sector data of 2 KB by the designated write data length at step S44.

At step S45, the CPU 10 calculates a PSN (Physical Sector Number) from the LBA transmitted thereto from the personal computer 30. Further, the CPU 10 sets the DVD signal processing section 11 to extract an address from the wobble so as to allow detection of an address for positioning control for moving the optical pickup unit 2 to a write start position on the DVD 1.

This setting makes it possible to perform positioning control for moving the optical pickup unit 2 to a write start position of the DVD 1. After the positioning control is completed, the data of the DVD 1 is written beginning with the designated PSN of the DVD 1.

At step S46, the CPU 10 reads out the data of the write data length in a unit of 32 KB (1 ECC=16 sectors) from within the data stored in the buffer memory 9 and transfers the read out data to the DVD signal processing section 11 through the memory control section 14 and the write data filter 22.

When the CPU 10 transfers the data stored in the buffer memory 9 to the DVD signal processing section 11 through the memory control section 14 and the write data filter 22, it causes the memory control section 14 to output the same data to the watermark detector 15. The watermark detector 15 detects digital watermark status from within the data and outputs the digital watermark status to the write data filter 22.

At step S47, the write data filter 22 discriminates based on the digital watermark status detected at step S46 whether the write data filter 22 itself should be turned ON or OFF.

The discrimination of whether the write data filter 22 should be turned ON or OFF is executed, for example, based on the table illustrated in FIG. 10.

Referring to FIG. 10, if the digital watermark status of "Copy Free" is detected, then it is discriminated that recording is permitted, and the recording data filter 22 is turned OFF. If the digital watermark status of "Copy Once" is detected, then it is discriminated that recording is inhibited, and the recording data filter 22 is turned ON. If the digital watermark status of "Copy No More" is detected, then it is discriminated that recording is inhibited, and the recording data filter 22 is turned ON. If the digital watermark status of "Copy Never" is detected, then it is discriminated that recording is inhibited, and the recording data filter 22 is turned ON.

In this instance, while, if the recording data filter 22 is turned ON even once, two techniques can be applied including a technique that the power supply to the disk drive is cut or the recording data filter 22 is kept ON so as to be valid until the DVD 1 is ejected from the disk driver and another technique that a result of the detection of digital watermark status by the watermark detector 15 is reflected at it is, any one of the two techniques may be applied.

If the write data filter 22 should be turned OFF, then the processing advances to step S48, but if the write data filter 22 should be turned ON, then the processing advances to step S49.

At step S48, since the write data filter 22 is OFF, the data of a unit of 32 KB (1 ECC block=16 sectors) transferred from the buffer memory 9 through the memory control section 14 passes through the write data filter 22 and is transferred to the DVD signal processing section 11.

The transferred data is subject to a DVD encoding process by the DVD signal processing section 11 and recorded onto the DVD 1 through the write processor 4 and the optical pickup unit 2.

At step S49, since the write data filter 22 is ON, part of sector data of each unit of 2 KB from within the data of a unit of 32 KB (1 ECC block=16 sectors) transferred from the buffer memory 9 through the memory control section 14 is masked by the write data filter 22 similarly as upon readout, and resulting data is transferred to the DVD signal processing section 11.

An object of the masking by the write data filter 22 described above is contents information such as the Video Pack (V_PCK), Audio Pack (A_PCK) and Sub-Picture Pack (SP_PCK) other than the Navi Pack (NV_PCK) which is control information, as shown in FIG. 11 and FIG. 12.

By excepting control information in this manner, only that contents information whose illegal reproduction is to be prevented can be masked without disturbing control of the video recording application in the personal computer 30.

It is to be noted that, in the disk drive represented as which present embodiment applied, the initial setting of the write data filter 22 upon writing is OFF and the filter operation is invalid.

Furthermore, although it is described above that the detection of digital watermark status by the watermark detector 15 at step S46 is performed simultaneously upon data transfer from the buffer memory 9 to the DVD signal processing section 11, if data is transferred from the buffer memory 9 to the watermark detector 15 and, after data to be filtered by the write data filter 22 is specified, the data is transferred from the buffer memory 9 to the write data filter 22, then the data can be masked with a higher of degree of reliability.

A disk player and a disk recorder to which the disk drive described above is applied are described below.

Figure 17:
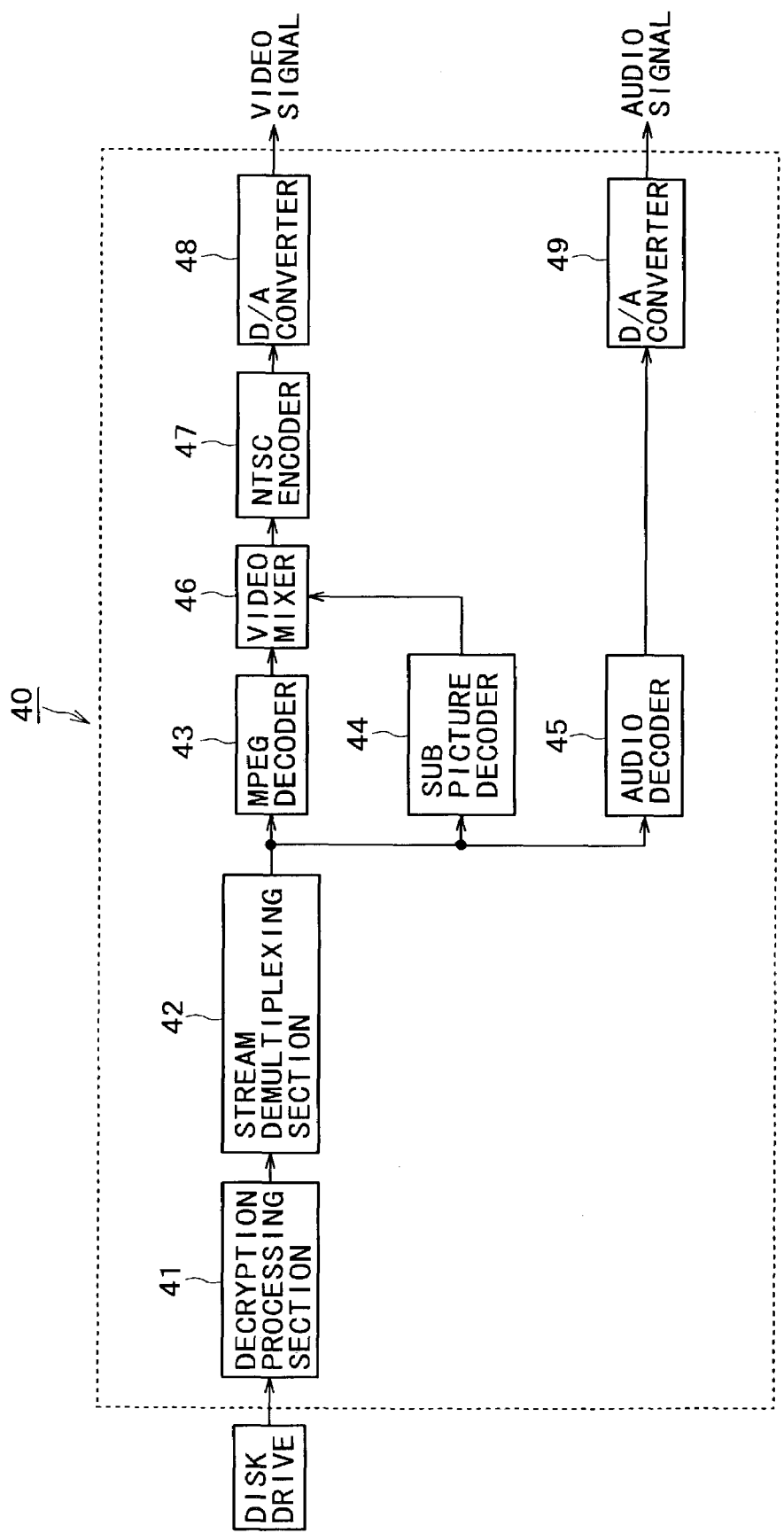
FIG. 17 is a block diagram showing a configuration of a disk player to which the disk drive is applied.

First, a configuration of the disk player 40 which reproduces the DVD 1 and outputs a resulting signal is described with reference to FIG. 17.

The disk player 40 includes the disk drive described hereinabove, a decryption processing section 41, a stream demultiplexing section 42, an MPEG decoder 43, a sub picture decoder 44, an audio decoder 45, a video mixer 46, an NTSC encoder 47, a D/A (digital to analog) converter 48 and another D/A converter 49.

If a signal outputted from the disk drive is an encrypted signal, that is, if encrypted data is recorded on the DVD 1, then the decryption processing section 41 decrypts the output signal of the disk drive into an MPEG signal which can be decoded.

The MPEG signal is demultiplexed into video packs, sub picture packs and audio packs by the stream demultiplexing section 42, from which they are outputted to the MPEG decoder 43, sub picture decoder 44 and audio decoder 45, respectively.

The video data and sub picture data decoded by the MPEG decoder 43 and the sub picture decoder 44, respectively, are synthesized by the video mixer 46 and then converted into an NTSC signal by the NTSC encoder 47. The NTSC signal is converted into and outputted as an NTSC analog signal (video signal) by and from the D/A converter 48.

Audio data decoded by the audio decoder 45 is converted into and outputted as an analog sound signal (audio signal) by and from the D/A converter 49.

If data inputted from the disk drive to the disk player 40 having the configuration just described is not encrypted data, then it has been discriminated at the stage preceding to the decryption processing section 41, that is, by the disk drive, whether or not the DVD 1 from which the data has been read out is an illegally duplicated disk. Accordingly, if the DVD 1 is an illegally duplicated disk, then since part of contents information of the data is replaced with dummy data, even if circuit alteration such as reconstruction of wiring lines or alteration to firmware is performed to furtively look at data having passed the decryption processing section 41, the contents information cannot be acquired. Therefore, the playback prevention function of an illegally duplicated disk is valid also with the disk player 40.

Subsequently, a configuration of a disk recorder 50 which records data onto a DVD 1 is described with reference to FIG. 18.

The disk recorder 50 includes an NTSC decoder 51, an A/D (analog to digital) converter 52, an MPEG encoder 53, a sub picture encoder 54, another A/D converter 55, an audio encoder 56, a stream multiplexing section 57 and an encryption processing section 58.

A video signal inputted to the disk recorder 50 is converted into component signals by the NTSC decoder 51 and converted from analog signals into digital signals by the A/D converter 52 and then outputted to the MPEG encoder 53.

The MPEG encoder 53 MPEG compresses the non-compressed video signal inputted thereto to form an MPEG video bit stream and outputs the MPEG video bit stream to the stream multiplexing section 57.

The stream multiplexing section 57 multiplexes video packs encoded by the MPEG encoder 53, sub picture packs encoded by the sub picture encoder 54 and audio packs encoded by the audio encoder 56 through the A/D converter 55.

When the multiplexed data is to be encrypted and recorded onto the DVD 1, it is encrypted by the encryption processing section 58 and outputted to the disk drive.

The data outputted from the disk recorder 50 having the configuration described above is subject to discrimination of whether it is to be illegally reproduced by the disk drive at the stage after the data is encrypted by the encryption processing section 58.

In order to encrypt and record data in accordance with a predetermined system onto the DVD 1, it is necessary to acquire a very severe license whichever encryption system is used. Accordingly, the video data and the audio data inputted to the disk recorder 50 and encrypted by the encryption processing section 58 are reliable data.

Even if encrypted data is illegally decrypted and inputted to the disk drive, since the disk drive replaces part of the contents information of the data with dummy data except that data which has the digital watermark status of "Copy Free", the function for preventing production of an illegally duplicated disk is valid also with the disk recorder 50.

While it is described that the disk recorder 50 receives analog signals as inputs thereto, also where the disk recorder 50 is configured otherwise such that it receives digital signals as inputs thereto, since the digital data is transferred while it is protected by the CGMS (Copy Generation Management System), the DTCP (Digital Transmission Copy Protection) or the like, the data inputted to the disk drive at the following stage is reliable data.

In this manner, the illegal duplication prevention function can function also with the disk player 40 and the disk recorder 50 for which the disk drive to which the present invention is applied is used.

While a preferred embodiment of the present invention has been described using specific terms, such description is for illustrative purposes only, and it is to be understood that changes and variations may be made without departing from the spirit or scope of the following claims.

What is claimed is:

1. A data reproduction apparatus, comprising:
   a disc holding unit configured to receive a recording medium on which data including digital watermark status is recorded;
   a disc determination unit configured to determine a type of the recording medium received by said disc holding unit;
   a read processor configured to read the data including the digital watermark status from the recording medium received by said disc holding unit;
   digital watermark status detection element configured to detect the digital watermark status from within the data read from the recording medium by said read processor;
   a discrimination circuit configured to determine, if it is determined by said disc determination unit that the recording medium is of a first type, that the data read by said read processor should not be filtered, but determining, if it is determined by said disc determination unit that the recording medium is of a second type, whether or not the data read by said read processor should be filtered based on the digital watermark status detected by said digital watermark status detection element;
   a filter unit configured to filter, if it is determined by said discrimination circuit that the data should be filtered, part of the data read by said read processor; and
   an output unit configured to output the data filtered by said filter unit and the data read by said read processor but not filtered by said filter unit.

2. The data reproduction apparatus according to claim 1, wherein said disc determination unit discriminates whether or not the recording medium received by said disc holding unit is a recording medium of the first type which is a recording medium for reproduction only or a recording medium of the second type which is a recordable recording medium.

3. The data reproduction apparatus according to claim 1, wherein said disc determination unit determines whether or not the data recorded on the recording medium received by said disc holding unit is encrypted data to make a determination between a disk of the first type which includes encrypted data and a disk of the second type which includes no encrypted data.

4. The data reproduction apparatus according to claim 3, wherein said disc determination unit detects information read out from a lead-in region of the recording medium and detects key information for decrypting the data recorded as encrypted data on the recording medium from within the read out information to determine that the data recorded on the recording medium is encrypted data.

5. The data reproduction apparatus according to claim 1, wherein said filter unit replaces part of the data with dummy data, which does not make sense as information, to filter the data.

6. The data reproduction apparatus according to claim 5, wherein the data replaced with the dummy data is contents data.

7. A data reproduction method, comprising:
   receiving a recording medium on which data including digital watermark status is recorded;
   discriminating a type of the received recording medium according to information recorded on the recording medium thereof;
   reading the data including the digital watermark status from the received recording medium;
   detecting the digital watermark status from within the data read from the recording medium;
   determining that the read data should not be filtered, when it is discriminated that the received recording medium is of a first type and outputting the read data based on the determination that the read data should not be filtered;
   determining whether or not the read data should be filtered based on the detected digital watermark status, when it is discriminated that the received recording medium is of a second type and outputting the read data based on the determination based on the digital watermark status that the read data should not be filtered; and
   filtering part of the read data based on the discrimination based on the digital watermark status that the read data should be filtered and outputting the filtered data.

8. The data reproduction method according to claim 7, wherein the step of discriminating the type of the recording medium discriminates whether or not the received recording medium is a recording medium of the first type which is a recording medium for reproduction only or a recording medium of the second type which is a recordable recording medium.

9. The data reproduction method according to claim 7, wherein the step of discriminating the type of the recording medium discriminates whether or not the data recorded on the received recording medium is encrypted data to make a discrimination between a disk of the first type which includes encrypted data and a disk of the second type which includes no encrypted data.

10. The data reproduction method according to claim 9, wherein the step of discriminating the type of the recording medium reads out, in response to the installation of the recording medium, from a lead-in region of the recording medium and detects key information recorded in the lead-in region for decrypting the data recorded as encrypted data on the recording medium to discriminate that the data recorded on the recording medium is encrypted data.

11. The data reproduction method according to claim 7, wherein said filter processing means replaces part of the data with dummy data, which does not make sense as information, to filter the data.

12. The data reproduction method according to claim 11, wherein the data replaced with the dummy data is contents data.

* * * * *

UNITED STATES PATENT AND TRADEMARK OFFICE
CERTIFICATE OF CORRECTION

PATENT NO.       : 7,327,934 B2                             Page 1 of 1
APPLICATION NO.  : 10/413026
DATED            : February 5, 2008
INVENTOR(S)      : Satoshi Kitani It is certified that error appears in the above-identified patent and that said Letters Patent is hereby corrected as shown below:

Column 10, line 45, change "000b" to --0000b--.

Column 12, line 52, change ""$C_{13}INDi$" to --C_INDi--.

Signed and Sealed this

Twelfth Day of August, 2008

JON W. DUDAS
*Director of the United States Patent and Trademark Office*